Inventor
Leslie A. Koenig
By Andrus & Starke
Attorneys

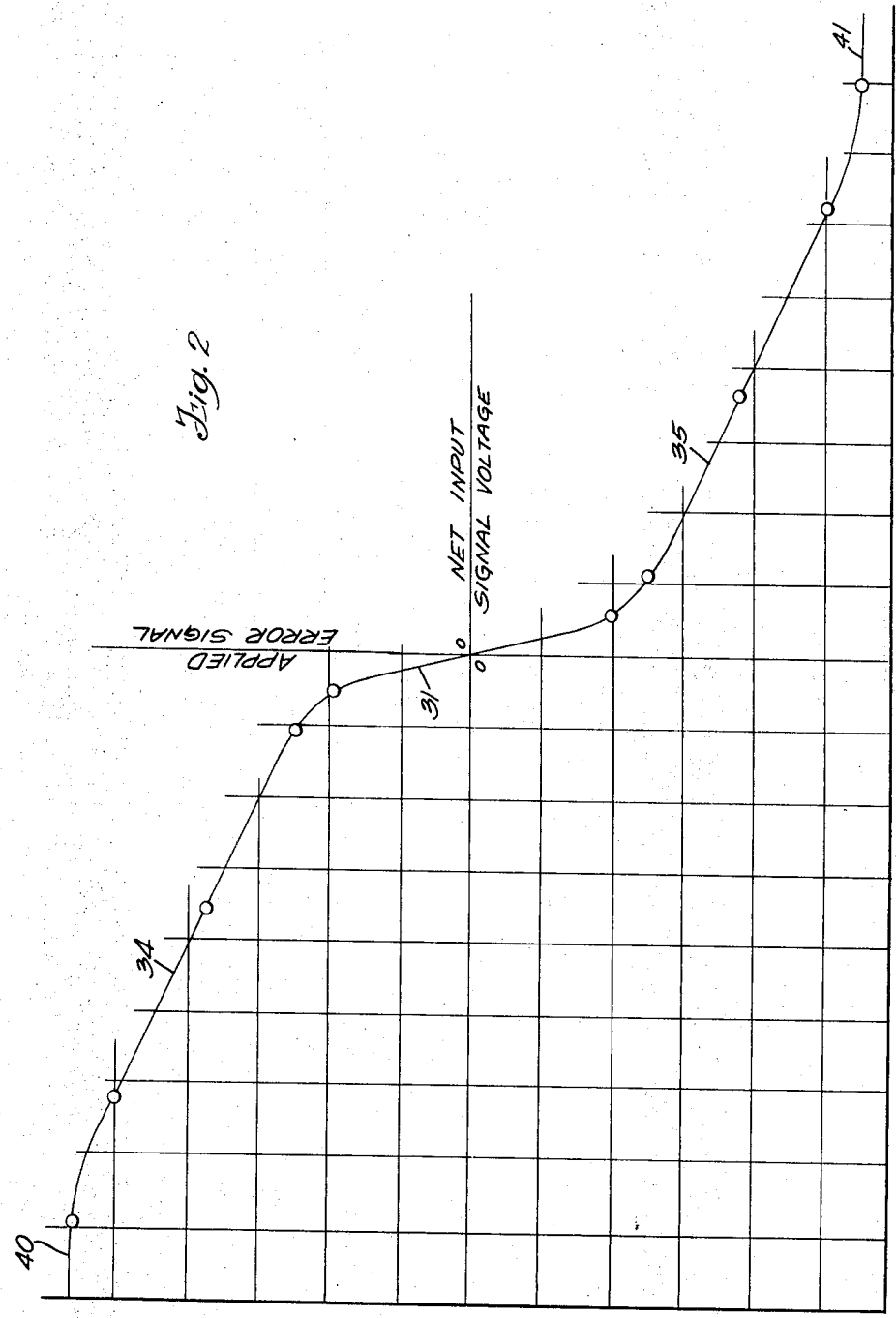

United States Patent Office 3,543,118
Patented Nov. 24, 1970

3,543,118
DYNAMOELECTRIC MACHINE CONTROL
CIRCUIT INCLUDING VARIABLE RE-
SPONSE NETWORK
Leslie A. Koenig, Cleveland, Ohio, assignor to A. O.
Smith Corporation, Milwaukee, Wis., a corporation of
New York
Filed Mar. 14, 1968, Ser. No. 713,089
Int. Cl. H02p 3/04
U.S. Cl. 318—331                                   11 Claims

ABSTRACT OF THE DISCLOSURE

This disclosure relates to a motor control circuit including an error operational amplifier and a summating signal amplifier connected in a closed loop. The error amplifier is constructed with a three feedback path characteristic of differing gain. Pairs of Zener diodes are connected in parallel with resistance elements of the three paths to selectively insert the resistances to establish a high gain for small error signals, an intermediate gain at intermediate operating error signals and a minimal gain at larger error signals. A cutoff relay is also connected across certain Zener diodes and corresponding resistors to establish minimal gain when a command signal is absent. The error operational amplifier is connected to the summing amplifier by paralleled diodes such that the error signal must rise above a selected level before it becomes operative.

---

Figure 1:
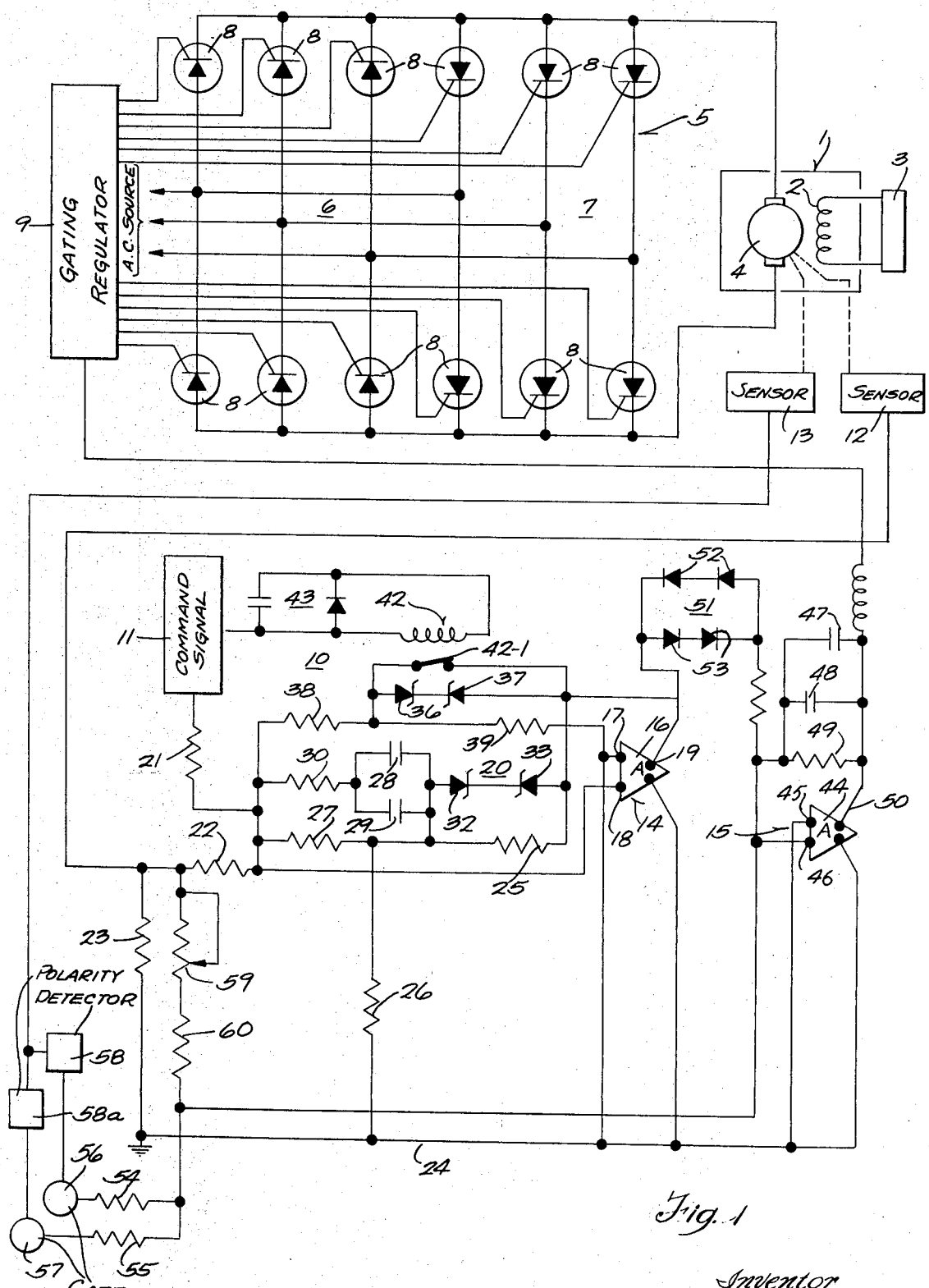

This invention relates to a dynamoelectric machine control circuit including a variable response network and particularly a motor control having a feedback network forming a part of a servo system for energizing of the motor.

Direct current (D.C.) motors may be conveniently controlled as to speed or torque output through a servo system responding to a command signal and a feedback signal proportional to the speed or torque. Thus the copending application of John T. Maynard, Dynamoelectric Control Circuit, which was filed on even date herewith, with Ser. No. 713,247, and assigned to a common assignee herewith, discloses a very satisfactory reversible D.C. motor having the armature energized from a silicon controlled rectifier bridge system with the torque being controlled by controlling of the direction and magnitude of the armature current. Accordingly, in the specific embodiment shown in that application a pair of full wave three phase bridge networks are connected in parallel to energize the armature from a suitable three phase input. Each of the bridge networks similarly includes a plurality of silicon controlled rectifiers having the usual control gates interconnected to a gating regulator. The gating regulator is controlled by a direct current signal proportional to the error signal and a counterelectromotive force signal. The error signal is generated by summing a command signal and a voltage feedback signal and is applied as one input to a summing amplifier. The counterelectromotive force signal is generated by combining the voltage feedback signal and an armature current feedback signal and applied as the second input to the summing amplifier, output of which is a summated error or trigger signal for actuating the gating regulator.

Although such a circuit can employ any suitable error amplifier the present invention is particularly directed to an improved amplifier providing rapid response to the level of the signal over the complete operating range and in particular providing a very rapid response during the period of crossover between the two bridge networks to reverse the direction of the armature current to the motor.

Generally, in accordance with the present invention, the error amplifier is constructed with a variable gain characteristic and particularly with a very high gain over a selected range of small error signals and with a relatively low gain over the range of relatively high error signals. The high gain minimizes a possible dead band area in the characteristic during the crossover from one bridge to another. At low values of error amplifier output, the motor armature current is discontinuous, and the armature current change per volt of error amplifier output is low. A high error amplifier gain therefore is desired in the discontinuous armature current region. At high values of error amplifier output the motor armature current becomes continuous, and the armature current change per volt of error amplifier output is high. In this continuous armature current region, a low error amplifier gain is desired to compensate for the high armature current per error amplifier volt.

The present invention in a further aspect includes a cutoff control responsive to a selected error signal to further limit the gain characteristic to positively prevent saturation of the amplifier which would require a long recovery time and prevent a desired rapid response characteristic.

In a more specific aspect of the present invention, the gain characteristic of the amplifier is controlled by voltage sensitive solid state elements and includes a suitable impedance in a high gain feedback network which is shunted by a suitable pair of opposed series-connected Zener diodes or other similar voltage sensitive devices. The voltage sensitive devices block current therethrough in the presence of small error signals and the current flows through the high gain feedback circuitry. As soon as the error signal reaches a selected level the appropriate voltage sensitive device conducts, thereby changing the feedback circuit and the gain characteristic to the desired low gain characteristic. Further, a second pair of opposed series connected voltage sensitive devices are interconnected in the feedback circuit to respond to a selected, larger error signal to further limit the gain characteristic and positively prevent driving of the error amplifier into saturation even with abnormally large error signals.

Further, the present invention preferably includes a switching means connected across the limiting voltage sensitive devices to the bypass circuit when the command signal is at zero. The bypass circuit avoids undesirable effects associated with drift characteristics in the feedback network.

In accordance with a further aspect of the invention, optimum stability has been provided by interposing a voltage sensitive control in the interconnection between the output of the error amplifier and the input of the summing amplifier. The amplified error signal must then reach a selective level before the summing amplifier will produce an output of a sufficient magnitude to actuate either one of the bridge networks of a motor control or the like. Applicant has found that paralleled diodes provide a very convenient means of inserting a limit in the circuit, requiring an amplified error signal of the order of a volt before the summing amplifier will provide a suitable triggering output.

The present invention has been found to provide a significant improvement in the response and stability of the closed loop system for controlling the motor current and particularly the triggering of the gated networks for controlling the motor current.

The drawings furnished herewith illustrates a preferred construction of the present invention in which the above advantages and features are clearly disclosed as well as others which will be clear from the following description of such drawings.

In the drawings:

FIG. 1 is a schematic circuit diagram showing the construction of the present invention with certain well known components shown by properly identified blocks; and FIG. 2 is a graphical illustration of the gain characteristics of the error amplifier shown in FIG. 1.

Referring to the drawing and particularly to FIG. 1, the present invention has been shown as part of a closed loop control for a direct current shunt motor of any well known construction. The illustrated shunt motor 1 is diagrammatically shown including a field 2 which may be connected to a fixed excitation source 3. An armature 4 is rotatably mounted within the field 2 and is connected to a direct current power supply circuit 5 which includes a pair of gated rectifier bridge networks 6 and 7. The bridge network 6 provides a forward armature current while the bridge network 7 provides a reverse armature current. The networks 6 and 7 are similarly constructed and each includes a plurality of gated silicon controlled rectifiers 8 connected in the well known three-phase full-wave bridge circuit having three-phase power supply lines connected as the input. A digital gating regulator 9 which forms a part of a feedback circuit 10 is interconnected to the gates of the controlled rectifiers 8 to control the particular point in each half cycle during which the rectifiers conduct. This provides a means of controlling the magnitude of the applied voltage and consequently the magnitude of the corresponding armature current.

The gating regulator 9 is controlled by a closed servo loop system including an input or command signal unit 11 which provides a direct current input voltage in proportion to the desired armature current. The output of unit 11 and a voltage feedback signal unit 12 and a current feedback signal unit 13 are interconnected to control the gating regulator 9 which may be constructed in accordance with the teaching of the previously described or identified copending application of John T. Maynard. The command signal unit 11 and the voltage feedback signal unit 12 are interconnected as the inputs to an error operational amplifier unit 14 to provide an amplified error signal. The output of the amplifier unit 14, the voltage feedback signal unit 12 and the current feedback signal unit 13 are interconnected as three inputs to a summing operational amplifier unit 15 to provide a summated or compensated error signal which is proportional to the error signal and the counterelectromotive force of the motor.

The present invention is particularly directed to the error operational amplifier unit 14 and its interconnection to the summing operational amplifier 15. Consequently these units are described in sufficient detail to clearly illustrate and describe an embodiment of the present invention. The other components are generally shown by appropriately identified block diagram as any desired construction may be employed.

The illustrated embodiment of the error operational amplifier unit 14 includes a suitable high negative gain amplifier 16 which also may be of any well known construction and is therefore shown in block diagram. Generally, the amplifier 16 includes a positive input terminal 17 and a negative input terminal 18 with the summated signals being applied thereto as hereinafter described. The amplifier 16 includes an output terminal 19 which provides an amplified signal proportional to the difference between the two input signals.

The amplifier 16 as previously noted is of any suitable construction will normally include suitable bias supply connections and an internal variable adjustment to permit original setting of the output signal with the input signals grounded. Such detail will be readily understood by those skilled in the art and because it is not necessary to an understanding of the present invention, such detail has not been shown. To establish the operational amplifying unit 14, a feedback network 20 interconnects the output terminal 19 to the input terminals 17 and 18. The amplifier 16 inverts the signal and thus with a positive input signal establishes a related proportional negative signal which energizes the summing amplifier unit 15.

The feedback network 20 in accordance with an important aspect of the present invention is especially constructed to provide a variable gain characteristic generally as shown in FIG. 2.

More particularly, the input to the operational amplifier unit 14 includes a command signal resistor 21 which connects the output of the command signal unit 11 to the negative input terminal 18. A corresponding voltage feedback resistor 22 interconnects the feedback voltage of feedback signal unit 12 to the corresponding negative terminal 18.

In the illustrated embodiment of the invention a load shunt resistor 23 is shown interconnected between the input side of the resistor 22 and a ground line 24 which is also connected to the terminal 17 of amplifier 16. In accordance with well known servo systems, the command signal and the feedback signal are D.C. signals of opposite polarity. Normally, the feedback armature voltage includes a certain ripple component which will be filtered to provide an essentially pure D.C. The command signal may be either of a positive or a negative polarity. It will be assumed for purposes of discussion that a positive command signal is associated with operation of the bridge network 6 and a forward armature current, while a negative command signal controls the network 7 and a reverse current. With this notation, the armature voltage is negative for a forward armature current and positive for reverse armature current. The input to amplifier 16 is therefore the algebriac summation of the command signal and the feedback signal and the output is an amplified error signal which is fed back through network 20 and applied to amplifier unit 15.

The preferred construction of the feedback network 20 includes a pair of resistors 25 and 26 connected in series between the output terminal 19 and ground line 24. A coupling resistor 27 is connected to the junction of resistors 25 and 26 and to the negative input terminal 18. A low pass active filter is provided to eliminate hunting of the control system and includes a pair of parallel capacitors 28 and 29 connected in series with a resistor 30 across the coupling resistor 27. In actual practice, the capacitors 28 and 29 may be individually connected into the circuit through pin plugs, not shown, to allow selection of any three combinations to thereby vary the time constant of the feedback network. This portion of network 20 is designed by the proper selection of resistance values to produce a relatively high overall gain of unit 14.

Referring particularly to FIG. 2, a graphical illustration of the overall gain characteristic of the operational amplifier unit 14 under steady state conditions is illustrated with the input error signal shown on the x-axis and the amplified error signal shown on the y-axis. The gain characteristic which is proportional to the slope of the line 31 is relatively high between 3.9 volts positive and 3.9 volts negative and is essentially constant over the range line. This corresponds to the feedback characteristics established by the above circuit. A pair of back to back connected Zener diodes 32 and 33 are connected in series with each other and in parallel with the resistor 25. The Zener diodes 32 and 33 function as a first signal responsive means to normally block the current path of the amplified error signal which then flows through resistor 25.

However, when the amplified error voltage reaches a selected level, one of the Zener diodes 32 and 33 will break down, depending upon whether the amplified error signal is negative or positive, and provide a feedback current through the path of the Zener diodes. The Zener diodes 32 and 33 in a practical construction were selected as 3.9 volt breakover diodes. Thus as long as the amplified error is less than 3.9 volts the Zener diode block the signal and resistor 25 is connected in the feedback circuit.

When the amplified error signal reaches the 3.9 volt level, the appropriate Zener diode 32 or 33 conduct and bypasses the feedback signal from resistor 25. The removal of resistor 25 increases the amplitude of the feedback signal and reduces the gain to that shown on lines 34 and 35 in FIG. 2.

The illustrated embodiment of the invention includes a further means to reduce the gain if the error signal rises above a selected level. A pair of Zener diodes 36 and 37 are connected in series opposing between the output terminal 19 and the junction of a pair of series connected resistors 38 and 39, the larger of which is interconnected to the positive terminal and the smaller of which is interconnected to the negative terminal 18.

The diodes 36 and 37 normally maintain this feedback path open. However, if the signal rises above a selected level, for example 11 volts, the appropriately poled diode 36 or 37 conducts and establishes a low resistance feedback path. The feedback signal is large and will limit the gain of the operational amplifier unit 14 and prevent driving of the amplifier 16 into saturation. This is shown graphically in FIG. 2 at the second break point in the gain characteristic of both the negative and positive side by the gain lines 40 and 41.

The illustrated embodiment of the invention further includes a zero command cutout relay 42 to limit the overall gain in the absence of a command signal from the signal unit 11. The zero command cutout relay 42 includes a pair of normally closed contacts 42–1 connected in parallel with the Zener diodes 36 and 37. The relay 42 is connected through a filter and polarity sensing network 43 to the command unit 11. The relay 42 is energized whenever the command unit 11 sends out a command signal and is deenergized when the command signal is zero. The relay contacts 42–1 are therefore closed whenever the command signal is zero and establish a low resistance feedback path. This maintains the overall gain of the amplifier unit 14 sufficiently low and particularly in the level of gain characteristic line 40 and 41 of FIG. 2 such that any signal which may be generated in the feedback circuit is not increased sufficiently to cause firing of either one of the networks. When a command signal is established, the relay 42 is energized to open the contacts 42–1 and thereby the corresponding feedback path.

The output of the error operational amplifier unit 14 is connected as one of the inputs to the summing amplifier unit 15.

The summing amplifier unit 15 is generally similar to that of the error amplifier unit and includes a high negative gain amplifier 44 having a positive input terminal 45 connected to grounded line 24 and a negative input terminal 46 connected as the summing input. A feedback network includes a pair of capacitors 47 and 48 and a resistor 49 connected in three parallel branches between an output terminal 50 and the negative input terminal 46.

The amplified error signal from the operational amplifier unit 14 is connected through a diode network 51 to terminal 45. Network 51 includes a first pair of series connected diodes 52 polarized to conduct in one direction with respect to the input terminal and a second pair of series connected diodes 53 connected in parallel with diodes 52 to conduct in the opposite direction. The paralleled branches similarly require that the corresponding amplified error signal reach a selected level before an input is applied to the summing amplifier. Generally, a pair of commercial diodes require an amplified voltage of about 0.7 to 1 volt.

As previously noted the summing amplifier unit 15 provides an output proportional to the summation of amplified error signal and a signal proportional to the counter electromotive force of the armature 4. In the illustrated embodiment of the invention, a positive armature current coupling resistor 54 is connected to the negative terminal 45 to provide a signal proportional to the voltage drop due to the resistance of the armature. A similar negative armature current coupling resistor 55 is also connected to the negative terminal 45 to provide a signal proportional to the voltage drop resulting from a negative armature current. The two coupling resistors 54 and 55 are selectively interconnected into the circuit through suitable control gates 56 and 57 which are selectively fired to insert the appropriate armature current signal into the circuit. As more fully developed in the copending application of John T. Maynard, the gates may be fired from suitable polarity detector units 58 and 58a which also control the firing of the networks 6 and 7.

To provide a signal proportional to the counter EMF, the armature voltage signal is interconnected to the negative input terminal of the summing amplifier 44 through a potentiometer 59 in series with a suitable fixed resistor 60. The output of the summing amplifier unit 15 will therefore be an amplified signal proportional to the summation of the amplified error signal and the difference between the armature voltage less the resistance voltage drop of the armature and thus directly proportional to the summation of the amplified error signal and the counter-electromotive force signal.

The operation of the illustrated embodiment of the invention may be briefly summarized as follows:

In the absence of a command signal, the relay 42 is de-energized and consequently the error operational amplifier unit 14 operates with a minimal gain such that drift or spurious signals arising in the feedback circuit or otherwise are not sufficiently amplified to produce an operative signal. In normal operation, any such signal will be so low as to be blocked by the diode network 51 or if not blocked will be so low that the output of the summing amplifier will not be sufficiently high to turn on the gating regulator 9. Consequently, the bridge networks 6 and 7 are held off and no armature current supplied. When the command signal is increased in a positive direction, the relay 42 is energized to open the contacts 42–1 thereby breaking the corresponding gain limiting feedback path. The operational amplifier unit 14 provides an amplified output signal proportional to the difference between the command signal and the armature voltage. During initial starting, the error signal is large and the overall gain is limited first by diode 36 and then by diode 32. An amplified error signal corresponding to the minimal or low gain characteristic is established and impressed on the summing amplifier unit 15 and summed with the counterelectromotive force signal to control the gating regulator 9 and produce full or maximum gating of the forward rectifiers. As the armature voltage and the related feedback voltage signal increase, the error signal is reduced until the set value is established. This system will continue to operate to maintain the armature voltage corresponding to the command voltage. If for any reason, either as a result of an input command signal or the feedback signal change, the input error signal should arise above 3.9 volts, the error amplifier operates in the second or intermediate gain range 35 to correspondingly maintain the armature voltage and current in accordance with the command signal and operates the motor at a corresponding speed or torque.

If the input error signal should rise above the selected maximum level, the second set of Zener diodes 36 conducts and provides a maximum feedback path to limit the amplification of the error amplifier unit 14 and maintain operation of the system with a relatively flat and small gain. With the present system it has been found that the response may readily be maintained in the area of microseconds. In contrast if a limit were not employed and the amplifier were allowed to saturate the response time might be of the order of milli-seconds.

The present invention has been found to provide rapid control response over the complete range of operation with a high degree of stability.

Various modes of carrying out the invention are contemplated as being within the scope of the following claims particularly pointing out and distinctly claiming the subject matter which is regarded as the invention.

I claim:

1. In a dynamoelectric machine control circuit having a closed looped network including an error operational amplifier having a feedback network, the improvement in said feedback network comprising a plurality of feedback branches for the amplifier including a first high gain branch defining a normal feedback path, and said branches further including a second reduced gain branch, and first signal responsive means to automatically insert the second reduced gain branch for selectively changing the feedback signal through said branches in response to a first selected signal related to the output level of the amplifier.

2. The machine control circuit of claim 1 having a third low gain branch and second signal responsive means to automatically insert the third low gain branch for selectively providing a third feedback path therethrough in response to a signal of a second selected level above the first named selected level.

3. The dynamoelectric machine control circuit of claim 1 wherein said first branch includes a feedback resistor, and said first signal responsive means includes a pair of series connected back-to-back Zener diodes connected in said second branch in parallel with said feedback resistor.

4. The dynamoelectric machine control circuit of claim 1 wherein said first high gain branch includes a resistor-capacitor network in series with a resistor and said first signal responsive means includes voltage breakdown means connected in said second branch in parallel with said resistor.

5. The dynamoelectric machine control circuit of claim 1 wherein said first branch includes a feedback resistor, said first signal responsive means includes a pair of series connected back-to-back Zener diodes in said second branch and in parallel with said feedback resistor, and having a third branch including a pair of series connected back-to-back Zener diodes in parallel with said first branch.

6. The dynamoelectric machine control circuit of claim 1 and including a command signal means connected as a first input to said error operational amplifier, and said plurality of feedback branches including a third low gain branch having means connected to said command signal means to selectively insert the third low gain branch for providing a third feedback path therethrough in response to a selected state of the command signal means.

7. The machine control circuit of claim 1 and including a command signal means and a third low gain branch including second signal responsive means to operatively insert the latter branch into the circuit in response to a second selected signal related to the output level of the amplifier, and means controlled by the command signal means and connected across said signal responsive means to insert the third low gain branch.

8. The dynamoelectric machine control circuit of claim 1 wherein said closed looped network includes a summing operational amplifier and a means connecting the output of the error operational amplifier to the summing operational amplifier, said means including signal blocking means responsive to the output of the error operational amplifier to block small signals below a selected level from said summing operational amplifier.

9. The dynamoelectric machine control circuit of claim 1 wherein said closed looped network includes a summing operational amplifier and a diode network connecting the output of the error operational amplifier to the summing operational amplifier, said diode network blocking signals below a selected voltage level from said summing operational amplifier.

10. The dynamoelectric machine control circuit of claim 1 and having a command signal unit providing a command signal input to said operational amplifier and said first branch includes a feedback resistor in series with a time constant control circuit means said second branch includes a pair of series connected back-to-back Zener diodes in parallel with said resistor, a third branch includes a second pair of series connected back-to-back Zener diodes and connected in parallel with said first branch, and contact means connected in parallel with said second pair of Zener diodes and coupled to be actuated by said command signal unit.

11. The dynamoelectric machine control of claim 1 having a third low gain branch including voltage breakdown means connected essentially to shunt said first two branches and to operatively insert the third low gain branch as a third feedback path in response to a voltage signal from said amplifier of a selected level above the first named selected level.

References Cited

UNITED STATES PATENTS

| | | | |
|---|---|---|---|
| 2,913,649 | 11/1959 | McKenney et al. | 318—28 XR |
| 3,179,869 | 4/1965 | Cory | 318—257 |
| 3,393,353 | 7/1968 | Martin | 318—331 |

BENJAMIN DOBECK, Primary Examiner

U.S. Cl. X.R.

318—257